United States Patent
Park et al.

(10) Patent No.: US 11,855,286 B2
(45) Date of Patent: Dec. 26, 2023

(54) CATHODE FOR ALL-SOLID-STATE BATTERY

(71) Applicant: KOREA INSTITUTE OF SCIENCE AND TECHNOLOGY, Seoul (KR)

(72) Inventors: Sang Baek Park, Seoul (KR); Byung Kook Kim, Seoul (KR); Jong Ho Lee, Seoul (KR); Ji Won Son, Seoul (KR); Kyung Joong Yoon, Seoul (KR); Hyoung Chul Kim, Seoul (KR); Ho Il Ji, Seoul (KR); Sung Eun Yang, Seoul (KR); Seung Hwan Lee, Seoul (KR); Joo Sun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 422 days.

(21) Appl. No.: 17/105,943

(22) Filed: Nov. 27, 2020

(65) Prior Publication Data
US 2022/0131142 A1   Apr. 28, 2022

(30) Foreign Application Priority Data

Oct. 23, 2020   (KR) .................. 10-2020-0138362

(51) Int. Cl.
| | |
|---|---|
| *H01M 4/525* | (2010.01) |
| *H01M 4/505* | (2010.01) |
| *H01M 4/131* | (2010.01) |
| *H01M 10/0562* | (2010.01) |
| *H01M 4/36* | (2006.01) |
| *H01M 10/0525* | (2010.01) |
| *H01M 4/134* | (2010.01) |

(52) U.S. Cl.
CPC ........... *H01M 4/525* (2013.01); *H01M 4/131* (2013.01); *H01M 4/134* (2013.01); *H01M 4/366* (2013.01); *H01M 4/505* (2013.01); *H01M 10/0525* (2013.01); *H01M 10/0562* (2013.01)

(58) Field of Classification Search
CPC ...... H01M 4/525; H01M 4/131; H01M 4/134; H01M 4/366; H01M 4/505; H01M 10/0525; H01M 10/0562; H01M 50/105; H01M 10/052; H01M 4/62; H01M 2300/0068; C01G 53/54; C01P 2002/32; Y02E 60/10
See application file for complete search history.

(56) References Cited

U.S. PATENT DOCUMENTS

2012/0100431 A1   4/2012   Yao et al.

FOREIGN PATENT DOCUMENTS

| KR | 1020170016747 A | 2/2017 |
|---|---|---|
| KR | 1020170057220 A | 5/2017 |
| KR | 1020180121266 A | 11/2018 |
| KR | 1020190032119 A | 3/2019 |

*Primary Examiner* — Helen Oi K Conley
(74) *Attorney, Agent, or Firm* — Rabin & Berdo, P.C.

(57) ABSTRACT

Disclosed are a cathode for an all-solid-state battery including a cathode thin film for an all-solid-state battery or a cathode composite membrane for an all-solid-state battery, and an all-solid-state battery including the same. The cathode for an all-solid-state battery contains a grain that has a plane having a low surface energy and has a grain boundary arranged parallel to the electron movement direction, thus effectively lowering the interfacial resistance of the thin film while suppressing the dissolution and diffusion of the transition metal, thereby improving the cycle stability of the all-solid-state battery including the same.

10 Claims, 11 Drawing Sheets

- Example 2

- Comparative Example 4

CATHODE FOR ALL-SOLID-STATE BATTERY

CROSS-REFERENCE TO RELATED APPLICATION

This application claims under 35 U.S.C. § 119(a) the benefit of priority to Korean Patent Application No. 10-2020-0138362, filed on Oct. 23, 2020, the entire contents of which are incorporated herein by reference.

BACKGROUND

(a) Technical Field

The present invention is a cathode for an all-solid-state battery including a cathode thin film for an all-solid-state battery or a cathode composite membrane for an all-solid-state battery that suppresses dissolution and diffusion of transition metals, and an all-solid-state battery including the same.

(b) Background Art

All-solid-state lithium metal batteries (ASLBs) are attracting a great deal of attention because they guarantee high stability due to inherent non-flammability thereof, and enable high energy density to be obtained by directly stacking cells in series.

In order to develop a high-capacity all-solid-state battery using a solid electrolyte, problems of (1) low ionic conductivity of the solid electrolyte at room temperature, and (2) high interfacial resistance at the electrode/electrolyte solid interface should be solved. In particular, the high interfacial resistance in the solid electrolyte/electrode interface is the main cause of deterioration in the overall performance of the battery and a phenomenon occurring at a solid-solid interface is different from a phenomenon occurring at a liquid-solid interface using a conventional liquid electrolyte. For this reason, there is need for research to understand the mechanism of operation relating thereto.

Meanwhile, in the prior art, strategies have been established according to so respective causes of the high interfacial resistance of the solid electrolyte/electrode. However, it is impossible in practice to apply all of them to one system, and even if applied, there would be a problem of causing high processing costs, and most solutions focus on introducing other materials, disadvantageously resulting in a tradeoff relationship with energy density due to the low activity of the introduced materials.

Accordingly, there is demand for a technology to improve the solid electrolyte/electrode interface characteristics through the improvement of cathode materials without introducing additional materials or processes.

PRIOR ART

Patent Document (Patent Document 1) Korean Patent Laid-open No. 10-2017-0057220

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

The present invention has been made in an effort to solve the above-described problems associated with the prior art, and the specific object thereof is as follows.

It is an object of the present invention to provide a cathode for an all-solid-state battery including a cathode thin film for an all-solid-state battery and a cathode composite membrane for an all-solid-state battery, each including a grain that has a grain boundary disposed parallel to an electron movement direction while predominantly having a plane with low surface energy, and an all-solid-state battery including the same.

The object of the present invention is not limited to those described above. The object of the present invention will be clearly understood from the following description, and are able to be implemented by means defined in the claims and combinations thereof.

In one aspect, the present invention provides a cathode thin film for an all-solid-state battery containing a grain containing Li and Mn, wherein the grain includes a first plane disposed on the upper side and having a polygonal shape, and a plurality of second planes having a polygonal shape including at least one of an edge and a vertex of the first plane, wherein the plurality of second planes are disposed adjacent to each other and are inclined in a thickness direction to surround the periphery of the first plane, and the grain suppresses dissolution and diffusion of the Mn.

The grain may include a compound represented by Formula 1 below:

$$Li_a Ni_b M_c N_d L_e O_x \qquad \text{[Formula 1]}$$

wherein M represents one or two elements selected from Mn and Co, N represents one or two or more elements selected from the group consisting of Mg, Al, Ti, Cr, and Fe, and L represents one or two or more elements selected from the group consisting of B, C, Na, Si, P, S, K, Ca, and Ba; and a, b, c, d, e, and x satisfy the following requirements of a/(b+c+d) is 0.80 to 1.30, b/(b+c+d) is 0 to 0.95, c/(b+c+d) is 0.05 to 1, d/(b+c+d) is 0 to 0.10, e/(b+c+d) is 0 to 0.010, b+c+d=1 or 2, and x is 1.5 to 4.

The grain may include a spinel structure, which is a space group of Fd-3m.

The polygonal shape of the first plane may include at least one selected from the group consisting of a square, a rectangle, a triangle and an octagon.

The polygonal shape of the second plane may include at least one selected from the group consisting of a trapezoid, a hexagon, a rectangle, and a triangle.

The cathode thin film for an all-solid-state battery may be a thin film including a grain predominantly including an exposed grain plane having a minimum surface energy.

The first plane of the grain dominantly including the exposed grain plane having the minimum surface energy may be an exposed grain plane having a rectangular shape, and the plurality of second planes of the grain dominantly including the exposed grain plane having the minimum surface energy may include an exposed grain plane including a long edge of the first plane and having a hexagonal shape.

The area ratio of the exposed grain plane having the minimum surface energy may be 50 to 100%, based on 100% of the total area of the first and second planes.

The exposed grain plane having the minimum surface energy may be a (111) plane.

The grain boundary in the grain may be disposed parallel to the electron movement direction.

In another aspect, the present invention provides an all-solid-state battery including a cathode layer including the cathode thin film for an all-solid-state battery and a current-collecting layer, an anode layer, and a solid electrolyte layer disposed between the cathode layer and the anode layer, wherein a charge/discharge rate after 100 cycles is 96% or more due to suppression of side reactions at an interface between the cathode layer and the solid electrolyte layer.

In another aspect, the present invention provides a cathode composite membrane for an all-solid-state battery containing a grain containing Li and Mn, and a solid electrolyte particle, wherein the grain includes a first plane disposed on the upper side and having a polygonal shape, and a plurality of second planes having a polygonal shape including at least one of an edge and a vertex of the first plane, wherein the plurality of second planes are disposed adjacent to each other and are inclined in a thickness direction to surround the periphery of the first plane, and the grain suppresses dissolution and diffusion of the Mn.

The grain may include a compound represented by Formula 1 below:

[Formula 1]

wherein M represents one or two elements selected from Mn and Co, N represents one or two or more elements selected from the group consisting of Mg, Al, Ti, Cr, and Fe, and L represents one or two or more elements selected from the group consisting of B, C, Na, Si, P, S, K, Ca, and Ba; and a, b, c, d, e, and x satisfy the following requirements of a/(b+c+d) is 0.80 to 1.30, b/(b+c+d) is 0 to 0.95, c/(b+c+d) is 0.05 to 1, d/(b+c+d) is 0 to 0.10, e/(b+c+d) is 0 to 0.010, b+c+d=1 or 2, and x is 1.5 to 4.

The grain may include a spinel structure, which is a space group of Fd-3m.

The polygonal shape of the first plane may include at least one selected from the group consisting of a square, a rectangle, a triangle and an octagon.

The polygonal shape of the second plane may include at least one selected from the group consisting of a trapezoid, a hexagon, a rectangle, and a triangle.

The cathode composite membrane for an all-solid-state battery may be a thin film including a grain predominantly including an exposed grain plane having a minimum surface energy.

The first plane of the grain dominantly including the exposed grain plane having the minimum surface energy may be an exposed grain plane having a rectangular shape, and the plurality of second planes of the grain dominantly including the exposed grain plane having the minimum surface energy may include an exposed grain plane including a long edge of the first plane and having a hexagonal shape.

The area ratio of the exposed grain plane having the minimum surface energy may be 50 to 100%, based on 100% of the total area of the first and second planes.

The exposed grain plane having the minimum surface energy may be a (111) plane.

The grain boundary in the grain may be disposed parallel to the electron movement direction.

In another aspect, the present invention provides an all-solid-state battery including a cathode composite layer, including the cathode composite membrane for an all-solid-state battery and a current-collecting layer, and an anode layer, wherein a charge/discharge rate after 100 cycles is 96% or more due to the suppression of side reactions at the interface between the cathode composite layer and the anode layer.

In another aspect, the present invention provides a pouch cell including the all-solid-state battery.

Other aspects and preferred embodiments of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

DETAILED DESCRIPTION

Figure 1A:
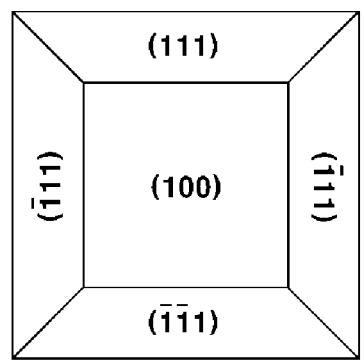
FIG. 1A is a top view of (100)-oriented grains included in Comparative Example 1 ((100)-oriented thin film) according to the present invention.

The objects described above, as well as other objects, features and advantages, will be clearly understood from the following preferred embodiments with reference to the attached drawings. However, the present invention is not limited to the embodiments, and may be embodied in different forms. The embodiments are suggested only to offer a thorough and complete understanding of the disclosed context and to sufficiently inform those skilled in the art of the technical concept of the present invention.

It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include numbers such as 10%, 11%, 12% and 13% as well as 30%, and any sub-ranges, such as ranges of 10% to 15%, 12% to 18%, or 20% to 30%, as well as any numbers, such as 10.5%, 15.5% and 25.5%, between appropriate integers that fall within the range.

The cathode for an all-solid-state battery according to an embodiment of the present invention includes a cathode thin film for an all-solid-state battery and a cathode composite membrane for an all-solid-state battery, each including a grain that has a grain boundary disposed parallel to an electron movement direction while predominantly having a plane with low surface energy. As a result, the interfacial resistance of the thin film can be effectively lowered while suppressing dissolution and diffusion of the transition metal, so the cycle stability of the all-solid-state battery including the same can be improved.

The cathode thin film for an all-solid-state battery according to an embodiment of the present invention includes a grain containing Li and Mn, wherein the grain includes a first plane disposed on the upper side and having a polygonal shape, and a plurality of second planes having a polygonal shape including at least one of an edge and a vertex of the first plane, wherein the plurality of second planes are disposed adjacent to each other and are inclined in a thickness direction to surround the periphery of the first plane, and the grain suppresses dissolution and diffusion of the Mn.

The grain included in the cathode thin film for an all-solid-state battery according to an embodiment of the present invention may include Li and Mn, and the grain preferably includes a compound represented by the following Formula 1 having a spinel structure, which is a space group of Fd-3m:

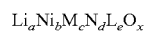  [Formula 1]

wherein M represents one or two elements selected from Mn and Co;

N represents one or two or more elements selected from the group consisting of Mg, Al, Ti, Cr, and Fe; and L represents one or two or more elements selected from the group consisting of B, C, Na, Si, P, S, K, Ca, and Ba; and a, b, c, d, e, and x satisfy the following requirements of a/(b+c+d) is 0.80 to 1.30, b/(b+c+d) is 0 to 0.95, c/(b+c+d) is 0.05 to 1, d/(b+c+d) is 0 to 0.10, e/(b+c+d) is 0 to 0.010, b+c+d=1 or 2, and x is 1.5 to 4.

The elements described above are each independently Li (lithium), Ni (nickel), Mn (manganese), Co (cobalt), Mg (magnesium), Al (aluminum), Ti (titanium), Cr (chromium), Fe (iron), B (boron), C (carbon), Na (sodium), Si (silicon), P (phosphorus), S (sulfur), K (potassium), Ca (calcium), Ba (barium), or O (oxygen).

The number of moles of the component may be represented with respect to the total number of moles of Ni, M, and N of 1 mole or 2 moles (i.e., b+c+d=1 or 2).

The Li may be present in an amount of 0.80 to 1.30 moles. When the content of Li is small, a grain structure with many lithium defects is obtained, and the capacity of the battery decreases when used for a cathode for a lithium secondary battery. When the content of Li is excessively great, Li may produce hydrates or carbonates such as lithium hydroxide or lithium carbonate, which are gelled during electrode production. For this reason, the content of Li may be defined within the range of 0.80 to 1.30 moles, preferably 0.85 to 1.20 moles.

The Ni may be present in an amount of 0 to 0.95 moles. When the content of Ni is excessively great, stability is poor. Preferably, the content of Li may be defined within the range of 0.50 to 0.95 moles, more preferably in the range of 0.60 to 0.95 moles.

Mn and Co of M increase thermal stability, but may deteriorate discharge capacity when the content thereof is excessively great. Therefore, the content thereof may be defined within the range of 0.05 to 0.60 moles, preferably 0.05 to 0.40 moles. The M component and the N component may form a precipitated hydrate with Ni, and can also be used as a raw material for a cathode material.

When one or two or more elements selected from the group consisting of Mg, Al, Ti, Cr, and Fe of N are included, they may be present within the range of 0 to 0.10 moles, and preferably 0.005 to 0.07 moles. Within this range, there are effects of appropriately lowering crystallinity and improving Li ion diffusion. When N is present in an amount more than 0.10 moles, the capacity of the battery may be deteriorated.

When one or two or more elements selected from the group consisting of B, C, Na, Si, P, S, K, Ca, and Ba of L are included, the resulting anode material has a small change in weight over time in an ambient atmosphere and room-temperature environment. Thus, L may include one or two or more selected from C, S and Ba. L may be present within the range of 0 to 0.010 moles in order to improve thermal stability. When L is present in an amount higher than 0.010 moles, the capacity may be greatly reduced. Preferably, Li may be present within the range of 0.001 to 0.008 moles.

More preferably, the grain included in the cathode thin film for an all-solid-state battery may be a compound represented by Formula 2 below:

 [Formula 2]

wherein y is 0 to 0.5.

When y exceeds 0.5, there is a disadvantage in that phase transition occurs from a cubic electric field to a quadrilateral electric field, resulting in a decrease in cathode capacity.

However, the above stoichiometric composition is not limited, and a composition enabling cations to be deficient or excessive, or oxygen ions to be deficient or excessive, while maintaining the grain structure may be embodied.

More preferably, y is 0.5, and the grain according to an embodiment of the present invention may include $LiNi_{0.5}Mn_{1.5}O_4$ having an operating voltage of 5V.

According to an embodiment of the present invention, there is no limitation as to the shape of the grain included in the cathode thin film for an all-solid-state battery containing the compound, as long as it has excellent high-temperature storage characteristics and high-temperature cycle characteristics. Preferably, the grain includes a first plane disposed on the upper side and having a polygonal shape, and a plurality of second planes having a polygonal shape including at least one of an edge and a vertex of the first plane, wherein the plurality of second planes are disposed adjacent to each other and are inclined in a thickness direction to surround the periphery of the first plane.

The polygonal shape of the first plane may include at least one selected from the group consisting of a square, a rectangle, a triangle and an octagon, and the polygonal shape of the second plane may include at least one selected from the group consisting of a trapezoid, a hexagon, a rectangle, and a triangle.

Accordingly, the cathode thin film for an all-solid-state battery according to an embodiment of the present invention may include the first and second planes, thereby including a grain having an exposed grain plane having variable surface energy, and preferably, includes a grain dominantly having an exposed grain plane having a minimal surface energy. Specifically, the cathode thin film may include at least one thin film selected from the group consisting of a (100)-oriented thin film including a (100)-oriented grain, a (110)-oriented thin film including a (110)-oriented grain, and a (111)-oriented thin film including a (111)-oriented grain. In this case, the (100)-orientation, (110)-orientation, and (111)-orientation mean that the top plane of the grain included in each thin film, that is, the first plane, is arranged in the (100) direction, the (110) direction and the (111) direction, respectively. More preferably, the cathode thin film for an all-solid-state battery according to an embodiment of the present invention may be a thin film, specifically, a (110)-oriented thin film, including a grain dominantly including an exposed grain plane having a minimum surface energy. Details thereof will be described later.

FIG. 1A is a top view of the (100)-oriented grain according to an embodiment of the present invention. Referring to this, the first plane of the (100)-oriented grain is a (100) plane having a square shape, and the plurality of second planes of the (100)-oriented grain includes a pair of (111) planes, each including a long edge of the first plane and having a trapezoidal shape.

Figure 1B:
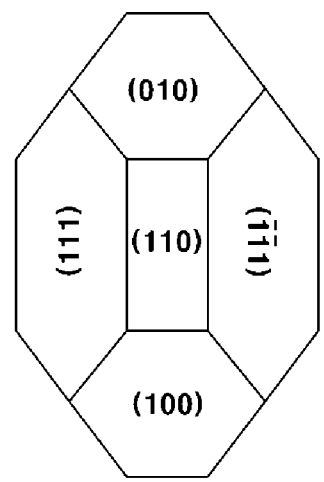
FIG. 1B is a top view of (110)-oriented grains included in Example 1 ((110)-oriented thin film) according to the present invention.

FIG. 1B is a top view of the (110)-oriented grain according to an embodiment of the present invention. Referring to this, the first plane of the (110)-oriented grain is a (110) plane having a square shape, and the plurality of second planes of the (100)-oriented grain includes a pair of (111) planes, each including a long edge of the first plane and having a trapezoidal shape wherein the (011) planes face each other and may further include a (010) plane and a (100) plane, each including a short edge of the first plane and having a hexagonal shape, wherein the (010) plane and the (100) plane face each other.

Figure 1C:
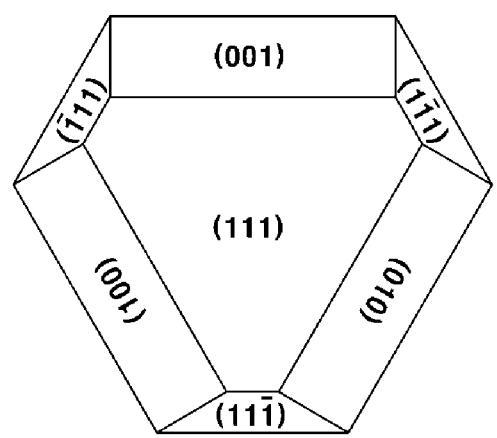
FIG. 1C is a top view of the (111)-oriented grains included in Comparative Example 2 ((111)-oriented thin film) according to the present invention.

FIG. 1C is a top view of the (111)-oriented grain according to an embodiment of the present invention. Referring to this, the first plane of the (111)-oriented grain is a (111) plane having a triangular or octagonal shape, and preferably, the octagonal shape may be an octagonal shape with a cut triangular edge, and each of the plurality of second planes of the (111)-oriented grain may include an edge when the first plane so is a triangular shape, or may include a (001) plane, a (100) plane and a (101) plane, each including a long edge and having a rectangular shape when the first plane is an octagonal shape, and may have an triangular shape having a vertex when the first plane is a triangular shape, or may include a plurality of (111) planes, each having a trapezoidal shape including a short edge, when the first plane has an octagonal shape. Preferably, the symmetrical opposite planes (not shown) may also include a first plane and a second plane, in the same manner as above.

Among the planes of the grain in the cathode thin film for an all-solid-state battery according to an embodiment of the present invention, an exposed grain plane having a minimum surface energy may dominantly have a dense atomic arrangement, and an exposed grain plane having a maximum surface energy may have a loose atomic arrangement. Preferably, among the planes of the grain in the cathode thin film for an all-solid-state battery according to an embodiment of the present invention, the (111) plane dominantly has a dense atomic arrangement, and the (110) plane and the (100) plane have a relatively loose atomic arrangement. Thus, the exposed grain plane with the minimum surface energy may be a (111) plane, and the exposed grain plane with the relatively high surface energy may be a (100) plane or a (110) plane. Accordingly, the grain according to an embodiment of the present invention predominantly includes an exposed grain plane with the minimum surface energy contained therein, that is, the (111) plane, thereby having a dense structure with low surface energy and suppressing dissolution and diffusion of transition metals.

Accordingly, the (100)-oriented thin film according to an embodiment of the present invention may include the (100) plane at a dominant area ratio, and the (110)-oriented thin film, and the (111)-oriented thin film may include the (111) plane at a dominant area ratio.

Specifically, the area ratio of the (111) plane of the (110)-oriented grain included in the (110)-oriented thin film and the (111)-oriented grain included in the (111)-oriented thin film may be 50 to 100% based on 100% of the total area of the first and second planes. Accordingly, the (110)-oriented thin film and the (111)-oriented thin film of the cathode thin film for an all-solid-state battery according to an embodiment of the present invention dominantly include the (111) plane, which is the exposed grain plane having the minimum surface energy, thereby more efficiently suppressing the dissolution and diffusion of transition metals.

Figure 2:
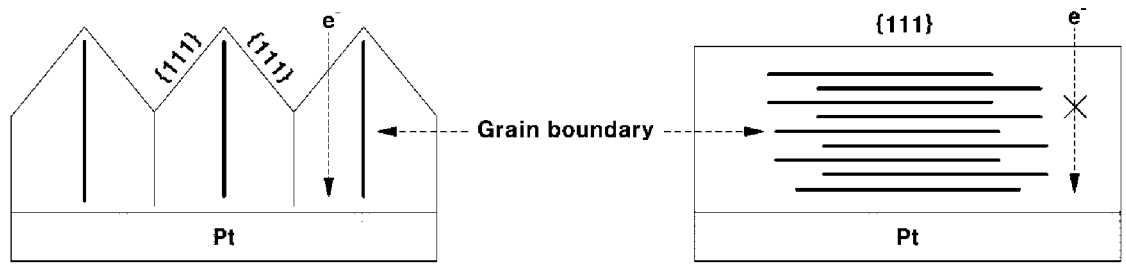
FIG. 2 is a cross-sectional view showing an arrangement of grain boundaries in grains included in the (110)-oriented thin film and the (111)-oriented thin film according to an embodiment of the present invention.

FIG. 2 is a cross-sectional view showing an arrangement of grain boundaries in grains included in the (110)-oriented thin film and the (111)-oriented thin film according to an embodiment of the present invention. Referring to this, the arrangement of the grain boundary in each of the (110)-oriented grain and the (111)-oriented grain may vary depending on the electron movement direction, and preferably, the (110)-oriented grain may be arranged parallel to the electron movement direction and the (111)-oriented grain may be arranged perpendicular to the electron movement direction.

The grain boundary is characterized by blocking the movement of electrons from the electrode including the same to the current collector, and the (111)-oriented grain is arranged perpendicular to the electron movement direction, so the (111)-oriented grain may include strong interfacial resistance.

Therefore, the thin film for an all-solid-state battery according to an embodiment of the present invention is preferably a (110)-oriented thin film that includes a (110)-oriented grain that has a grain boundary arranged parallel to the electron movement direction so as to efficiently reduce the interfacial resistance of the thin film, while predominantly including the (111) plane, which is the exposed grain plane having the minimum surface energy, so as to more efficiently suppress the dissolution and diffusion of the transition metal.

That is, the grain having the above structure, included in the cathode thin film for an all-solid-state battery according to an embodiment of the present invention, dominantly includes a low-energy plane, among the first and second planes, thus suppressing dissolution and diffusion of the transition metal.

The all-solid-state battery according to an embodiment of the present invention may include a cathode layer including the cathode thin film for an all-solid-state battery according to the present invention and a current-collecting layer, an anode layer, and a solid electrolyte layer disposed between the cathode layer and the anode layer.

The current-collecting layer included in the cathode layer may include a general current-collecting layer that can be used in the present invention, for example, a current-collecting layer containing at least one selected from the group consisting of Pt, Au, and Al. The current-collecting layer is not limited to containing a specific element, but may preferably be a current collector layer containing Pt, which is electrochemically stable at a cathode operating voltage.

In addition, the current-collecting layer may be first subjected to epitaxial growth on a substrate in order to produce the cathode thin film for an all-solid-state battery according to an embodiment of the present invention as a (110)-oriented thin film, a (100)-oriented thin film, or a (111)-oriented thin film.

The anode layer may include a conventional anode layer that can be used in the present invention, and may, for example, include at least one selected from the group consisting of Li, graphite, and Si, and is not limited to containing a specific element. Preferably, it may contain Li, having a high energy density.

The solid electrolyte layer may include a general solid electrolyte layer that can be used in the present invention, and may, for example, include one or more selected from the group consisting of LIPON, $Li_7La_3Zr_2O_{12}$ (LLZO), and a sulfide solid electrolyte, and it is not limited to containing a specific element. Preferably, it may include LIPON, characterized by low incidence of side reactions at the cathode/anode interface.

The all-solid-state battery according to an embodiment of the present invention can be produced by a conventional method using each of the layers.

Figure 7:
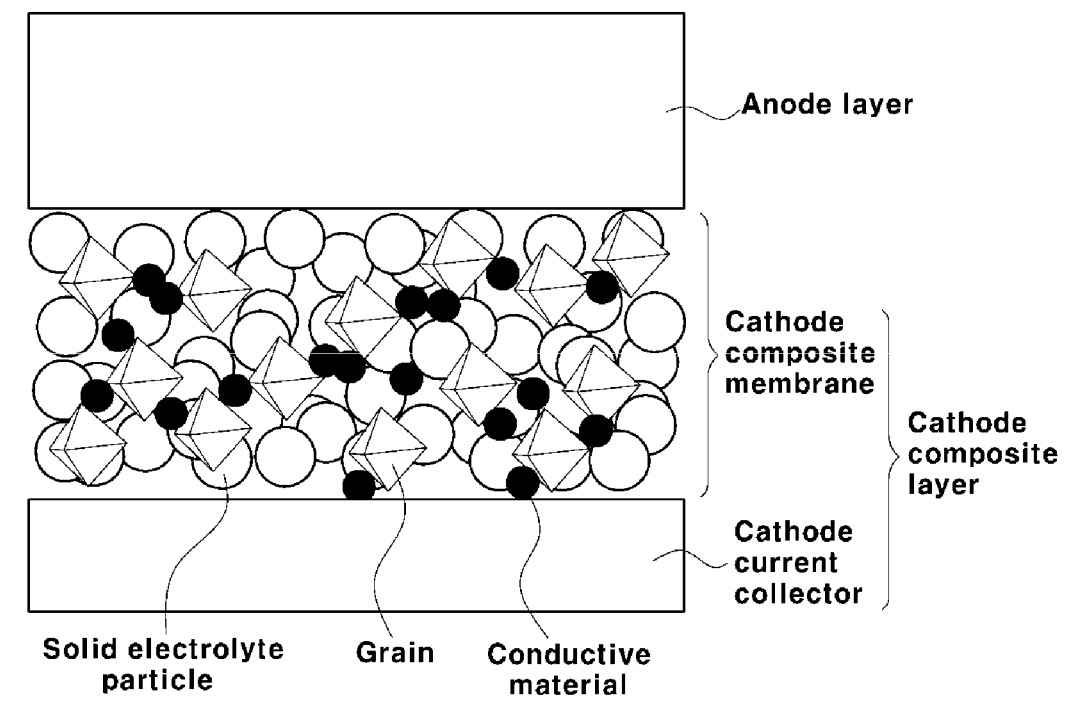
FIG. 7 is a cross-sectional view showing an all-solid-state battery including a cathode composite membrane for an all-solid-state battery according to another embodiment of the present invention.

As shown in FIG. 7, the cathode composite membrane according to an embodiment of the present invention includes a grain containing Li and Mn, and a solid electrolyte particle, and may further include a conductive material, wherein the grain includes a first plane disposed on the upper side and having a polygonal shape, and a plurality of second planes having a polygonal shape including at least one of an edge and a vertex of the first plane, wherein the plurality of second planes are disposed adjacent to each other and are inclined in a thickness direction to surround the periphery of the first plane, and the grain suppresses dissolution and diffusion of the Mn.

The grain included in the cathode composite membrane according to another embodiment of the present invention may be the same as the grain included in the cathode thin film for an all-solid-state battery according to the present invention.

The solid electrolyte particle included in the cathode composite membrane according to another embodiment of the present invention may include a component included in the solid electrolyte layer included in the all-solid-state battery according to the embodiment of the present invention, wherein the component included in the solid electrolyte layer may be the same as that described above.

The all-solid-state battery according to another embodiment of the present invention may include a cathode composite layer including the cathode composite layer for an all-solid-state battery according to the present invention and a current-collecting layer, and an anode layer.

The current-collecting layer and the anode layer may be the same as the current-collecting layer and the anode layer of the all-solid-state battery according to an embodiment of the present invention.

The all-solid-state battery according to another embodiment of the present invention can be produced by a conventional method using the respective layers.

Accordingly, the all-solid-state battery according to an embodiment of the present invention can more efficiently suppress the dissolution and diffusion of transition metals by including the cathode thin film for an all-solid-state battery according to the present invention in the cathode layer, and can efficiently reduce the interfacial resistance of the thin film by having a grain boundary arranged parallel to the electron movement direction, thus improving the cycle stability of the battery without incurring additional costs or causing a tradeoff with regard to the fed material.

In addition, the pouch cell according to another embodiment of the present invention includes any one of the all-solid-state batteries according to the embodiments described above.

The pouch cell may include a pouch-type battery cell in which an electrode assembly (including a cathode current collector, a cathode layer, a solid electrolyte layer, an anode layer, and an anode current collector) is accommodated in a pouch-shaped case.

Hereinafter, the present invention will be described in more detail with reference to specific examples. However, the following examples are provided only for illustration of the present invention, and thus should not be construed as limiting the scope of the present invention.

Example 1: Cathode Layer Containing Cathode Thin Film for all-Solid-State Battery as (110)-Oriented Thin Film A (110)-oriented MgO substrate (MTI Co., Korea) having a single crystal was prepared and then washed by ultrasonic treatment using a solution of acetone and isopropanol.

Then, the washed MgO substrate was annealed in a microwave at a temperature of 1200° C. for 6 hours to remove the hydroxide and carbonate remaining on the surface of the MgO substrate to thereby prepare a MgO substrate having a well-aligned surface enabling epitaxial growth.

Then, a cathode current collector including Pt was formed on the MgO substrate using current (DC) magnetron sputtering.

Then, $Li_{1.2}Ni0.5Mn_{1.5}O_4$ (RND Korea Co., Ltd., 4") was deposited on the cathode current collector using radio-frequency (RF) magnetron sputtering at a temperature of 650° C. with a power of 150 W to prepare a cathode thin film for an all-solid-state battery including a grain, as shown in FIG. 1A.

Then, the cathode thin film was annealed at 700° C. for 1 hour to finally produce a cathode thin film for an all-solid-state battery.

Comparative Example 1: Cathode Layer Containing Cathode Thin Film for all-Solid-State Battery as (100)-Oriented Thin Film A cathode layer was produced in the same manner as in Example 1, except that a (100)-oriented MgO substrate (MTI Co., Korea) having a single crystal was prepared, and a cathode thin film for an all-solid-state battery including the grain as shown in FIG. 1B was deposited at a temperature of 650° C. with a power of 150 W.

Comparative Example 2: Cathode Layer Containing Cathode Thin Film for all-Solid-State Battery as (111)-Oriented Thin Film A cathode layer was produced in the same manner as in Example 1, except that a (111)-oriented MgO substrate (MTI Co., Korea) having a single crystal was prepared, and a cathode thin film for an all-solid-state battery including the grain as shown in FIG. 1C was deposited at a temperature of 650° C. with a power of 150 W.

Example 2: All-Solid-State Battery Including Cathode Layer According to Example 1

An all-solid-state battery including the cathode layer produced according to Example 1, an anode layer containing Li, and a solid electrolyte layer containing LiPON disposed between the cathode layer and the anode layer was produced by a vacuum deposition method.

Comparative Example 3: All-Solid-State Battery Including Cathode Layer According to Comparative Example 1

An all-solid-state battery including the cathode layer produced according to Example 2, an anode layer containing Li, and a solid electrolyte layer containing LiPON disposed between the cathode layer and the anode layer was produced by a vacuum deposition method.

Comparative Example 4: All-Solid-State Battery Including Cathode Layer According to Comparative Example 2

An all-solid-state battery including the cathode layer produced according to Example 3, an anode layer containing Li, and a solid electrolyte layer containing LiPON disposed between the cathode layer and the anode layer was produced by a vacuum deposition method.

Experimental Example 1: Observation of Crystal (Grain) Structure and Morphology of Cathode Thin Film for all-Solid-State Battery Cathode thin films for an all-solid-state battery were produced according to Example 1, Comparative Example 1 and Comparative Example 2, and subjected to XRD pattern analysis and Raman spectroscopy to confirm the crystal structure and morphology thereof, and the results are shown in FIGS. 3A and 3B.

Figure 3A:
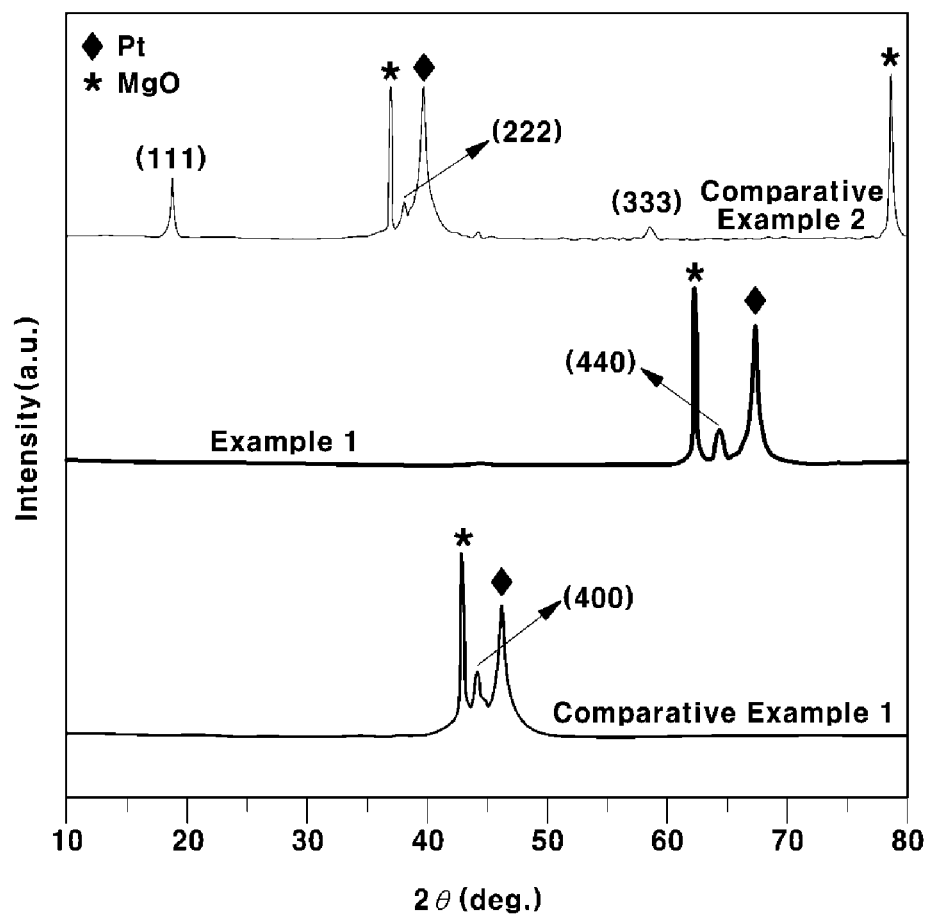
FIG. 3A is a graph showing XRD patterns of cathode thin films for all-solid-state batteries according to Example 1, Comparative Example 1 and Comparative Example 2 of the present invention.
Figure 3B:
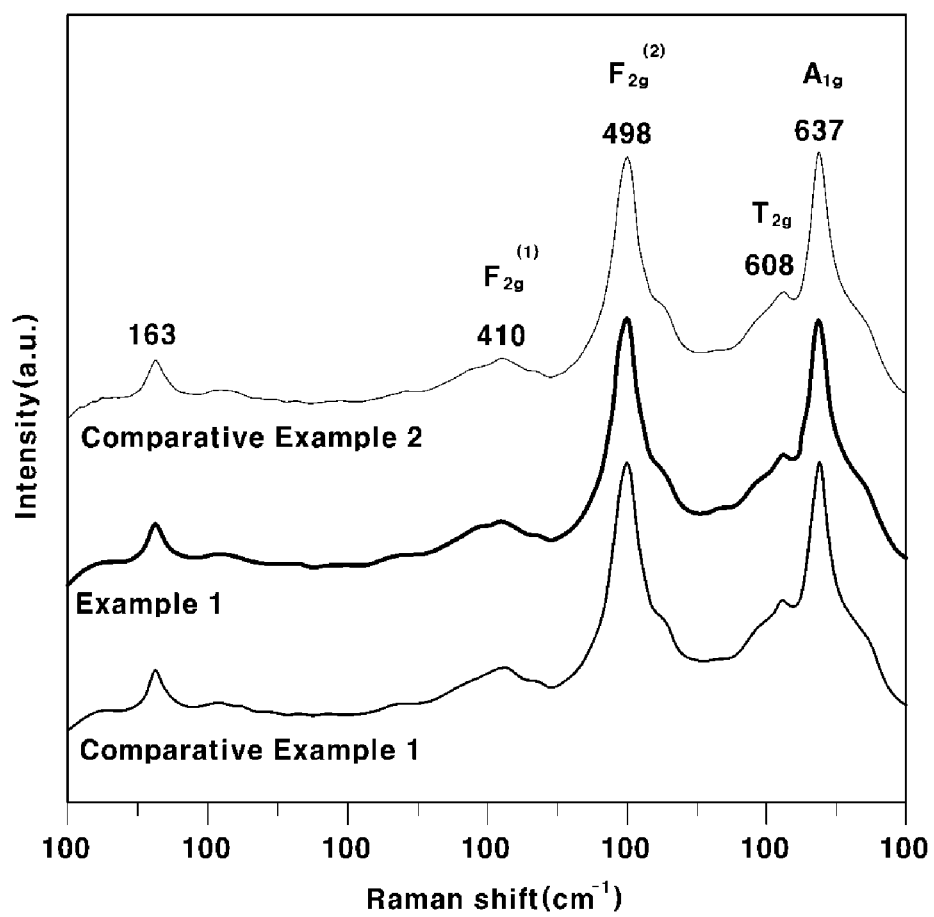
FIG. 3B is a graph showing the result of Raman spectroscopy analysis of the cathode thin films for all-solid-state batteries according to Example 1, Comparative Example 1 and Comparative Example 2 of the present invention.

As can be seen from FIG. 3A, the grains included in the cathode thin films for an all-solid-state battery according to Example 1, Comparative Example 1, and Comparative Example 2 were epitaxially grown on, as the first plane, a (100) plane, a (110) plane, and a (111) plane. As can be seen from FIG. 3B, a strong peak of about 637 $cm^{-1}$ was assigned to the symmetric Mn—O stretch of spinel, and peaks of about 498 and 410 $cm^{-1}$ were assigned to the symmetric Ni—O stretch of spinel, which indicates that a spinel structure was formed. In particular, Example 1, Comparative Example 1, and Comparative Example 2 exhibited a clear single peak at 608 $cm^{-1}$, which indicates that all of them have an disordered Fd3m structure.

Figure 3C:
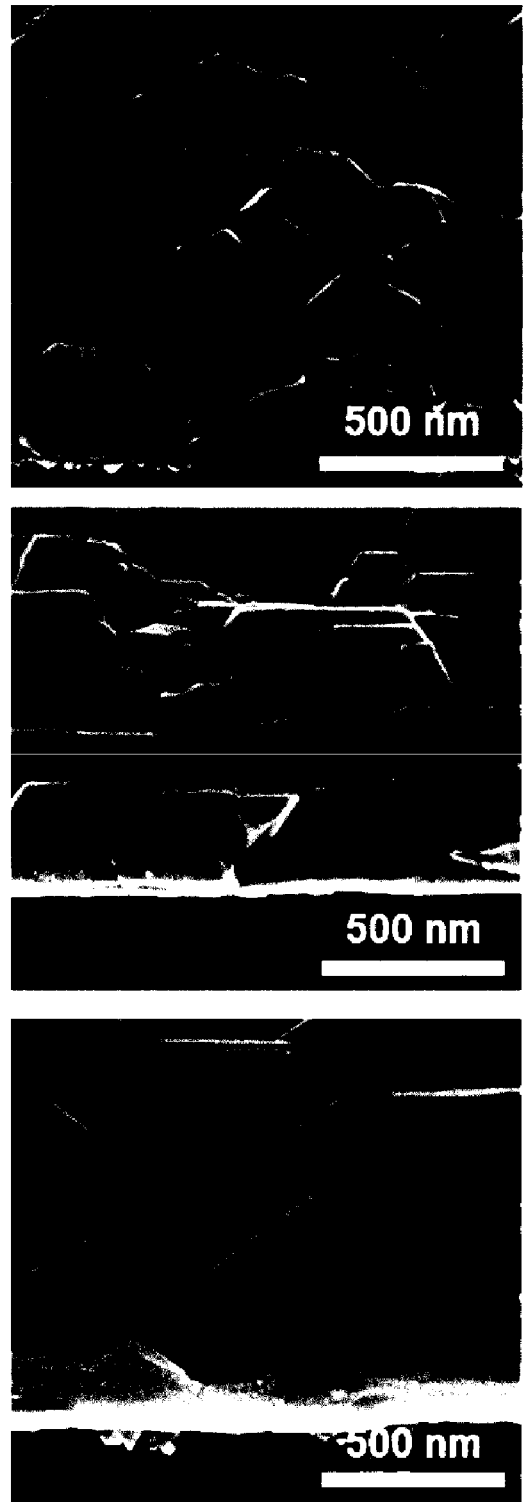
FIGS. 3C and 3D are an SEM image and an AFM image, respectively, of the cathode thin films for all-solid-state batteries according to Example 1, Comparative Example 1 and Comparative Example 2 of the present invention.
Figure 3D:
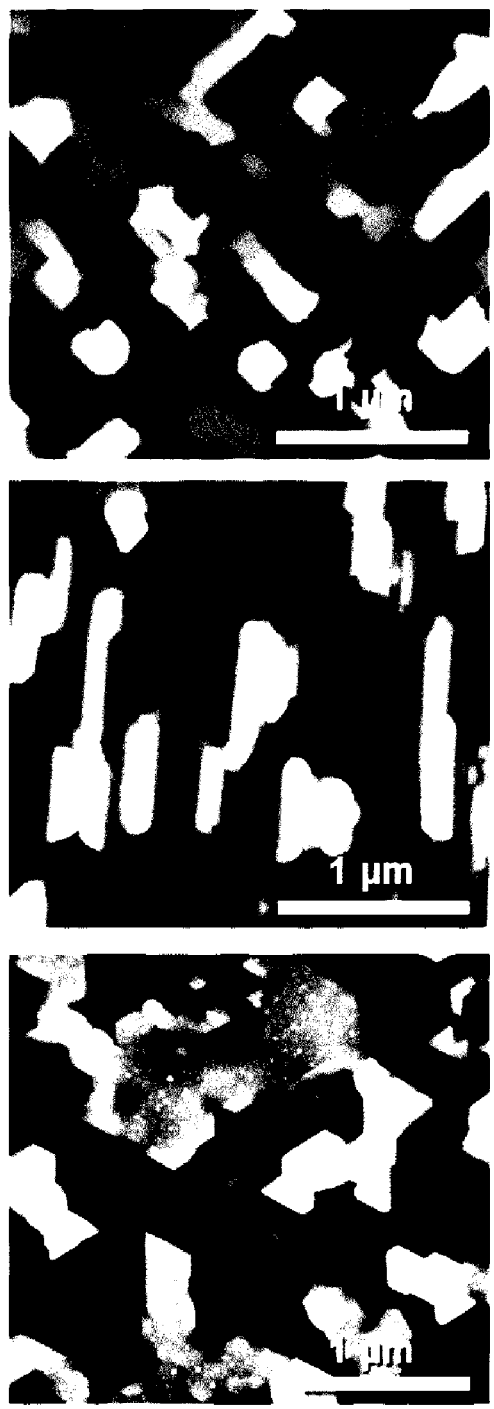

In addition, SEM and AFM images showing the structures and shapes of the so grains included in the cathode thin film for an all-solid-state battery according to Example 1, Comparative Example 1 and Comparative Example 2 are shown in FIGS. 3C and 3D.

As can be seen from FIGS. 3C and 3D, the structures of the grains included in the cathode thin films for all-solid-state batteries according to Example 1, Comparative Example 1, and Comparative Example 2 have rectangular, square, and triangular or octagonal shapes, respectively, and according to Wulff's cubic structure, the square, rectangular, triangular, or hexagonal planes were arranged in the [110], [100], and [111] directions.

In addition, when observing the structure of the grain of Experimental Example 1, it was found that Comparative Example 1 had a high area ratio of the (100) plane, whereas Example 1 and Comparative Example 2 had a high area ratio of the (111) plane.

Experimental Example 2: Analysis of Surface Morphology of Grain Plane of Cathode Thin Film for all-Solid-State Battery After producing cathode thin films for all-solid-state batteries according to Example 1, Comparative Example 1 and Comparative Example 2, grain planes of the cathode thin films were analyzed by XPS to confirm the surface morphology of grain planes, and the results are shown in FIGS. 4A to 4D.

Figure 4A:
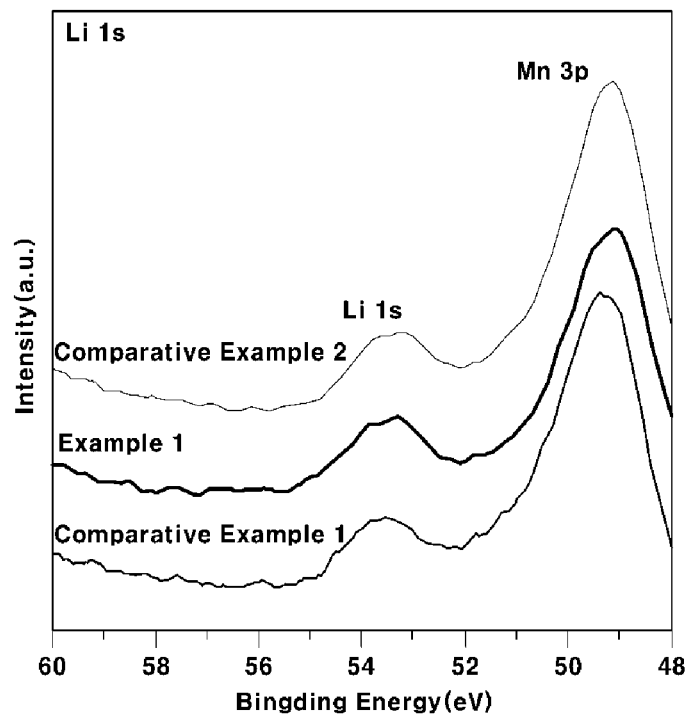
FIG. 4A is a graph showing the result of analysis of a Li 1s peak after analyzing, by XPS, the surface of the cathode thin films for all-solid-state batteries according to Example 1, Comparative Example 1 and Comparative Example 2 of the present invention.
Figure 4B:
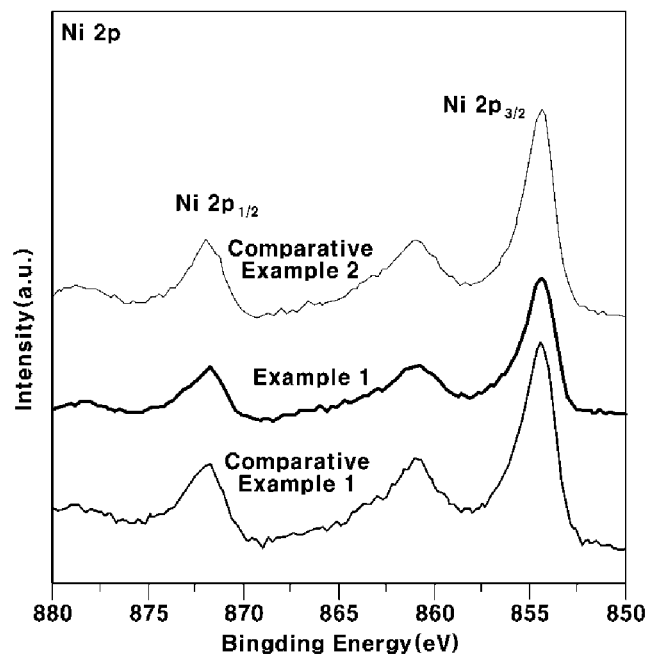
FIG. 4B is a graph showing the result of analysis of a Li 2p peak after analyzing, by XPS, the surface of the cathode thin films for all-solid-state batteries according to Example 1, Comparative Example 1 and Comparative Example 2 of the present invention.
Figure 4C:
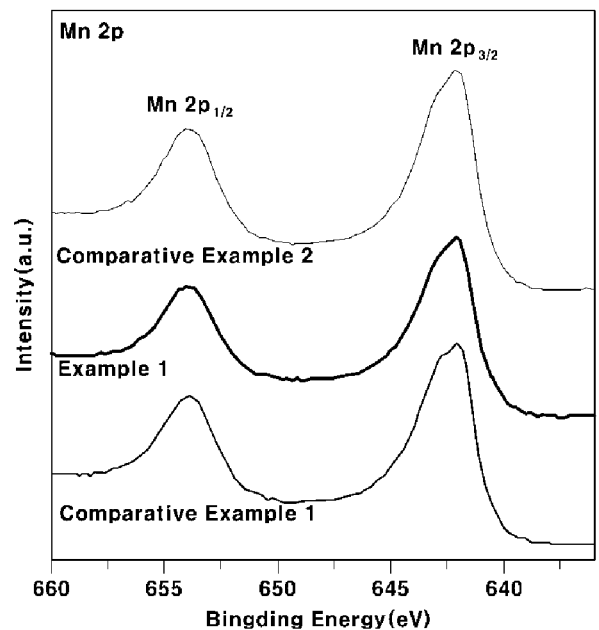
FIG. 4C is a graph showing the result of analysis of a Mn 2p peak after analyzing, by XPS, the surface of the cathode thin films for all-solid-state batteries according to Example 1, Comparative Example 1 and Comparative Example 2 of the present invention.
Figure 4D:
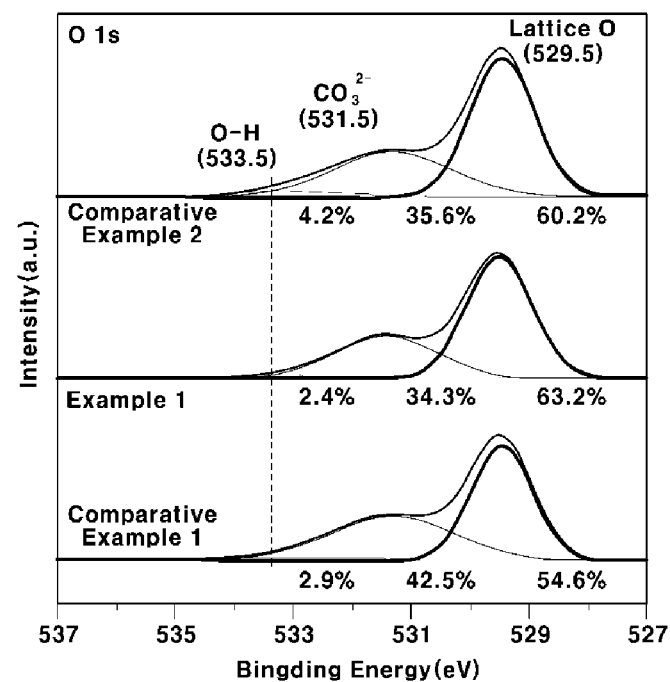
FIG. 4D is a graph showing the result of analysis of an O 1s peak after analyzing, by XPS, the surface of the cathode thin films for all-solid-state batteries according to Example 1, Comparative Example 1 and Comparative Example 2 of the present invention.

As can be seen from FIGS. 4A to 4D, the Li 1s, Ni 2p and Mn 2p peaks were almost identical to each other in all of Examples 1 to 3 (FIGS. 4A to 4C), but the O 1s peak exhibited different characteristics between samples (FIG. 4D). Referring thereto, the O 1s spectrum may have three peaks. The first peak at 529.5 eV corresponds to the oxygen atom of the lattice, the second peak at 531.5 eV corresponds to the oxygen atom of $Li_2CO_3$, and the third peak at 533.5 eV corresponds to the oxygen atom in the surface pollutant.

In this case, the ratio of $Li_2CO_3$ in the O 1s region was almost the same in Example 1 and Comparative Example 2, and the ratio was much higher in Comparative Example 1. That is, this means that a thicker $Li_2CO_3$ layer was formed in Comparative Example 1 than in Example 1 and Comparative Example 2. That is, taking into consideration the fact that the $Li_2CO_3$ layer can be formed on the surfaces of Examples 1 and Comparative Examples 1 and 2 by $CO_2$ and $H_2O$ during cooling after annealing, when the thickness of the $Li_2CO_3$ layer is different, the thermodynamic energy of each surface is different. Thus, Comparative Example 1 has a relatively higher surface energy, the atomic densities of the grain planes exposed to the surfaces of Example 1 and Comparative Example 1 and Comparative Example 2 descend in order, which corresponds to the reverse order of surface energy increase in the (111) plane, (110) plane and (100) plane.

As a result, Comparative Example 1 is less stable than Examples 1 and 2, and thus $Li_2CO_3$ is formed more spontaneously on the surface of Comparative Example 1, thus reducing the surface energy in the annealing process. The results demonstrated that the surface of Comparative Example 1 has a relatively smaller portion of the (111) plane than the surfaces of Examples 1 and 2.

Experimental Example 3: Analysis of Electrochemical Properties of all-Solid-State Battery After producing all-solid-state batteries according to Example 2, Comparative Example 3 and Comparative Example 4, the battery capacity was analyzed at an initial stage and after 100 cycles to analyze the electrochemical properties thereof, and the results are shown in FIGS. 5A and 5B.

Figure 5A:
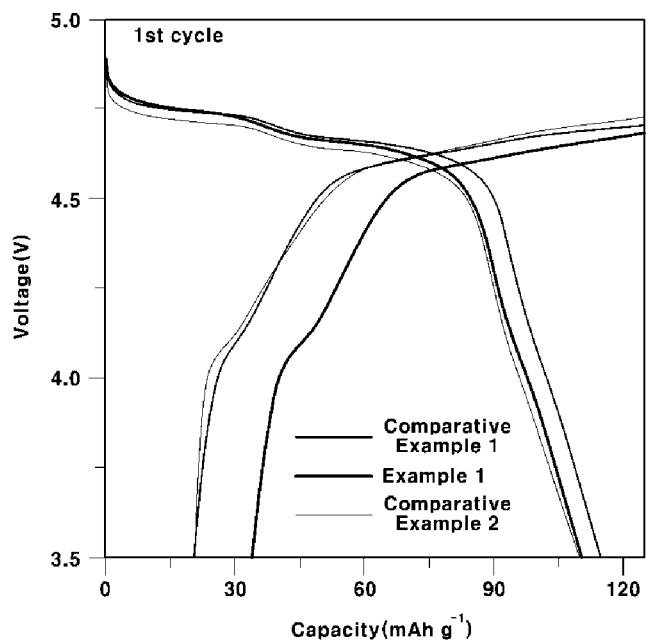
FIG. 5A is a graph showing an initial battery capacity of all-solid-state batteries according to Example 2, Comparative Example 3 and Comparative Example 4 of the present invention.

As can be seen from FIG. 5A, Comparative Example 3, Example 2, and Comparative Example 4 exhibited capacities of 114.6, 110.4 and 109.9 mAh $g^{-1}$ at a rate of 0.5 C, respectively, so the initial capacity of Comparative Example 3 was slightly higher than the initial capacity of Example 2 and Comparative Example 4.

Figure 5B:
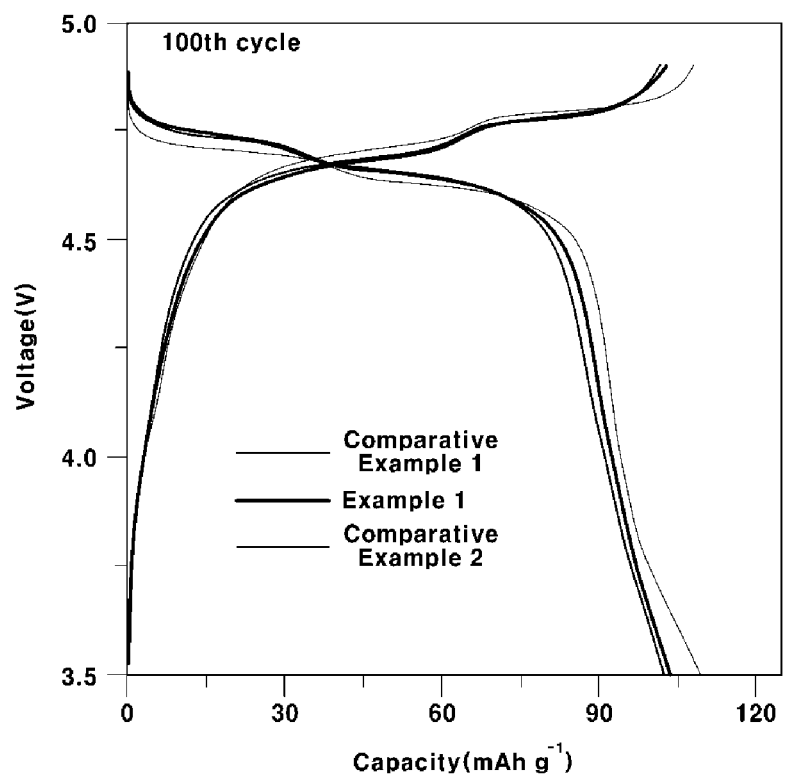
FIG. 5B is a graph showing a battery capacity after 100 cycles of all-solid-state batteries according to Example 2, Comparative Example 3 and Comparative Example 4 of the present invention.

However, the result of analysis of FIG. 5B shows that the battery capacity after 100 cycles was the highest in Comparative Example 4 and was the lowest in Comparative Example 3. Specifically, the battery capacities of Comparative Example 3, Example 2, and Comparative Example 4 were 103.8, 107.8, and 109.4 mAh $g^{-1}$, respectively, which corresponded to 90.6%, 97.6% and 99.6% of the first cycle capacity, respectively.

Figure 5C:
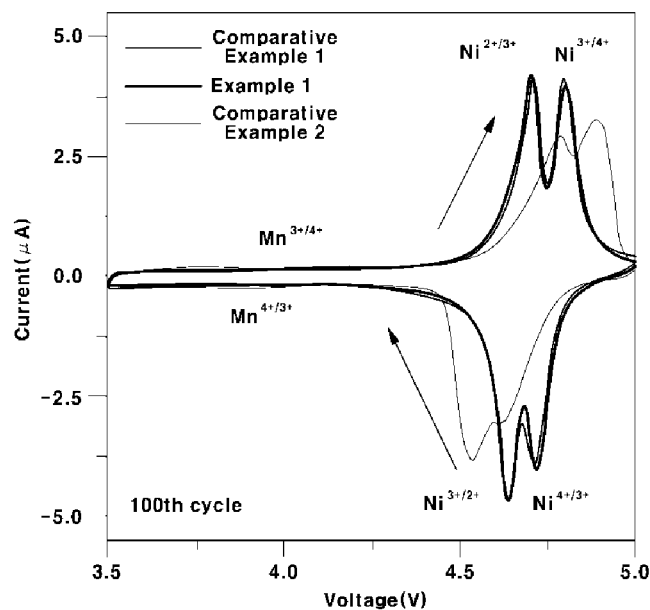
FIG. 5C is a graph showing a CV curve of all-solid-state batteries according to Example 2, Comparative Example 3 and Comparative Example 4 of the present invention.

All-solid-state batteries were produced according to Example 2, Comparative Example 3 and Comparative Example 4, and a CV curve showing a redox peak is shown in FIG. 5C.

As can be seen from FIG. 5C, the amount of electric charge calculated in the integrated region of the CV curve was 9.72, 9.93 and 10.00 mC in Comparative Example 3, Example 2, and Comparative Example 4, respectively. That is, Example 2 including Example 1 and Comparative Example 4 including Comparative Example 2, each predominantly including the (111) plane, were more stable than Comparative Example 3 including Comparative Example 1 predominantly including the (100) plane.

Experimental Example 3: Interface Analysis of all-Solid-State Battery

Figure 6A:
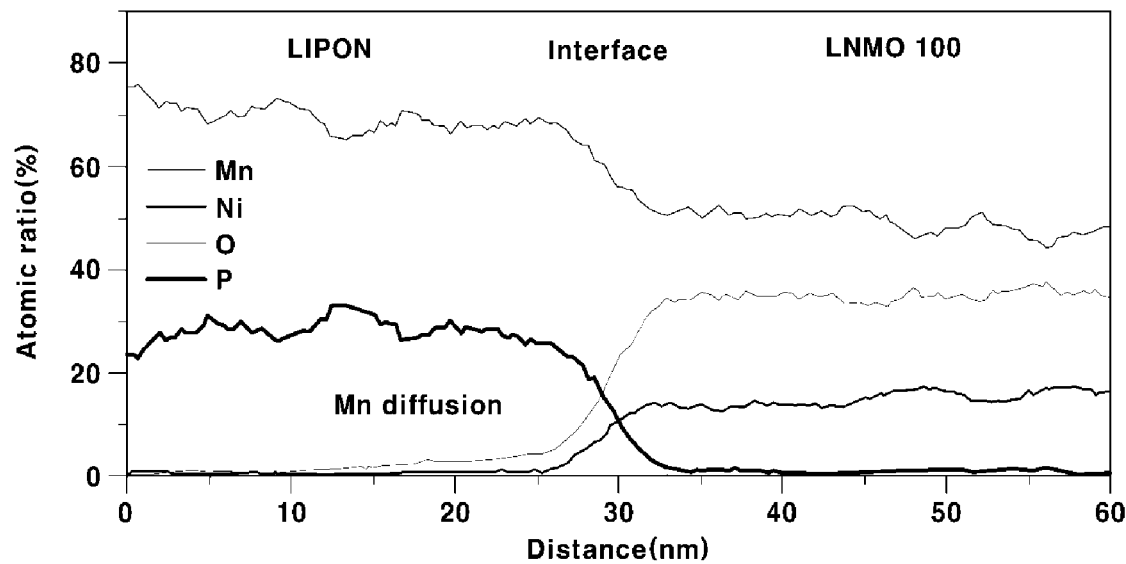
FIGS. 6A and 6B are, respectively, graphs showing the results of EDS line scanning of all-solid-state batteries according to Comparative Example 3 and Comparative Example 4 of the present invention.
Figure 6B:
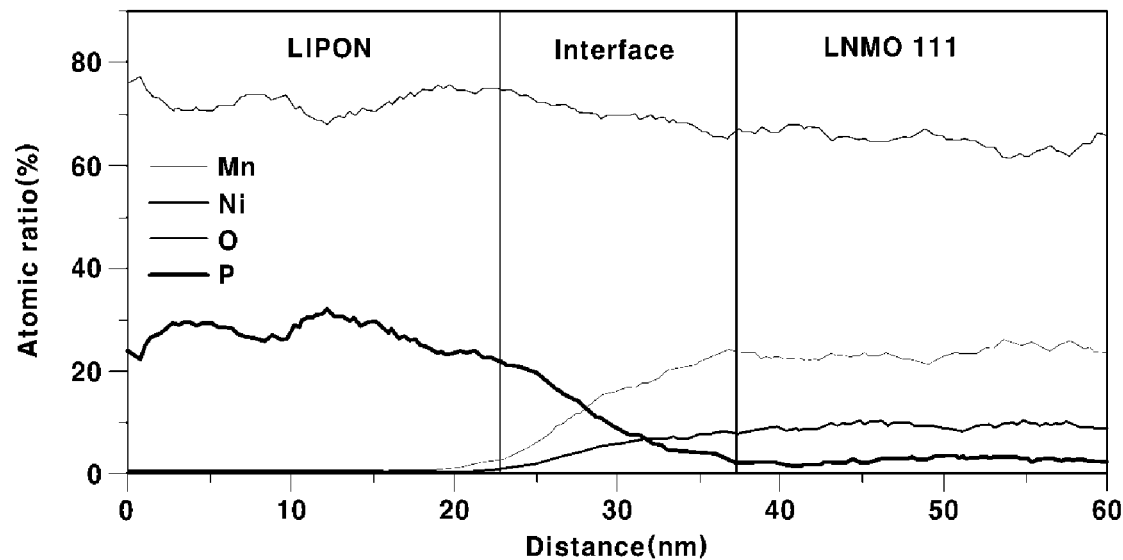

After producing the all-solid-state batteries according to Example 2, Comparative Example 3 and Comparative Example 4, the EDS line across the interface between the solid electrolyte layer and the cathode layer was scanned for the interface analysis, and the results are shown in FIGS. 6A and 6B.

As can be seen from FIG. 6A, an extended tail in which Mn of Comparative Example 1 included in Comparative Example 3 diffuses into the solid electrolyte layer appeared, whereas Mn of Comparative Example 2 included in Comparative Example 4 had neither diffusion nor an extended tail.

These results showed that the stable (111) plane suppressed the dissolution and diffusion of the transition metal at the solid interface during the charge-discharge cycle, which means that the (111) plane promoted a higher cyclic stability than in Comparative Example 1 with the (100) plane.

Figure 6C:
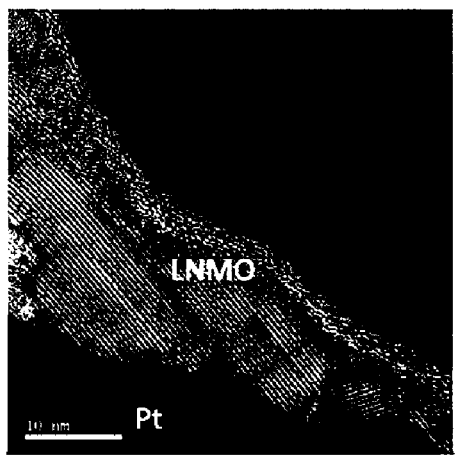
FIG. 6C is an SEM image of the cross section of all-solid-state batteries according to Example 2 and Comparative Example 4.
Figure 6C:
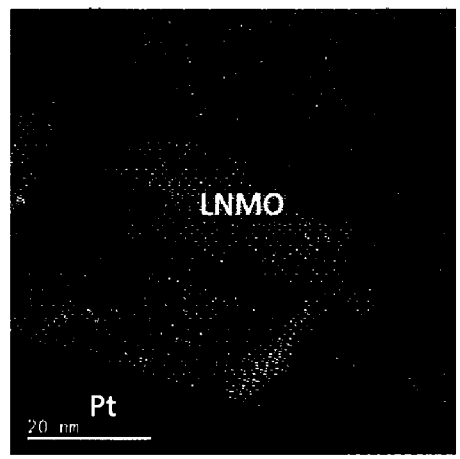

In addition, as can be seen from FIG. 6C, the layer of Comparative Example 2 included in Comparative Example 4 includes grain boundaries in the grains perpendicular to the electron movement direction and parallel to the substrate, and the layer of Comparative Example 1 included in Example 2 includes grain boundaries in the grain parallel to the electron movement direction.

That is, Comparative Example 1 included in Example 2 includes a grain in which the grain boundary in the grain is arranged parallel to the electron movement direction, so that the interfacial resistance of the thin film can be efficiently lowered.

In summary, the present invention relates to a cathode for an all-solid-state battery and an all-solid-state battery including the same. The cathode for an all-solid-state battery according to the present invention has a grain that has a plane having a low surface energy, and has a grain boundary arranged parallel to the electron movement direction, thus effectively lowering the interfacial resistance of the thin film while suppressing the dissolution and diffusion of the transition metal, thereby improving the cycle stability of the all-solid-state battery including the same.

As is apparent from the foregoing, the present invention provides a cathode for an all-solid-state battery including a cathode thin film for an all-solid-state battery or a cathode composite membrane for an all-solid-state battery, and an all-solid-state battery including the same. The cathode for an all-solid-state battery according to the present invention contains a grain that has a plane having a low surface energy and has a grain boundary arranged parallel to the electron movement direction, thus effectively lowering the interfacial resistance of the thin film while suppressing the dissolution and diffusion of the transition metal, thereby improving the cycle stability of the all-solid-state battery including the same.

The effects of the present invention are not limited to those mentioned above. It should be understood that the effects of the present invention include all effects that can be inferred from the description of the present invention.

The present invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A cathode thin film for an all-solid-state battery comprising a grain containing Li and Mn,
   wherein the grain comprises;
   a first plane disposed on the upper side and having a polygonal shape; and
   a plurality of second planes having a polygonal shape including at least one of an edge and a vertex of the first plane,
   wherein the plurality of second planes have a crystal orientation that differs from the first plane, and are disposed adjacent to each other and are inclined in a thickness direction to surround the periphery of the first plane, and
   wherein the grain suppresses dissolution and diffusion of the Mn; and
   wherein the grain comprises a compound represented by Formula 1 below:

$$Li_aNi_bM_cN_dL_eO_x$$ [Formula 1]

wherein M represents one or two elements selected from Mn and Co;
   N represents one or two or more elements selected from the group consisting of Mg, Al, Ti, Cr, and Fe; and
   L represents one or two or more elements selected from the group consisting of B, C, Na, Si, P, S, K, Ca, and Ba; and
   a, b, c, d, e, and x satisfy the following requirements of a/(b+c+d) is 0.80 to 1.30, b/(b+c+d) is 0 to <0.65, c/(b+c+d) is 0.05 to 1, d/(b+c+d) is 0 to 0.10, e/(b+c+d) is 0 to 0.010, b+c+d is 1 or 2, and x is 1.5 to 4; and
   wherein the cathode thin film for an all-solid-state battery is a thin film including a grain predominantly including an exposed grain plane having a minimum surface energy.

2. The cathode thin film according to claim 1, wherein the grain comprises a spinel structure, which is a space group of Fd-3m.

3. The cathode thin film according to claim 1, wherein the polygonal shape of the first plane comprises at least one selected from the group consisting of a square, a rectangle, a triangle and an octagon.

4. The cathode thin film according to claim 1, wherein the polygonal shape of the second plane comprises at least one selected from the group consisting of a trapezoid, a hexagon, a rectangle, and a triangle.

5. The cathode thin film according to claim 1, wherein the first plane of the grain dominantly including the exposed grain plane having the minimum surface energy is an exposed grain plane having a rectangular shape, and
   the plurality of second planes of the grain dominantly including the exposed grain plane having the minimum surface energy comprises an exposed grain plane including a long edge of the first plane and having a hexagonal shape.

6. The cathode thin film according to claim 1, wherein an area ratio of the exposed grain plane having the minimum surface energy is 50 to 100% based on 100% of a total area of the first and second planes.

7. The cathode thin film according to claim 1, wherein the exposed grain plane having the minimum surface energy is a (111) plane.

8. The cathode thin film according to claim 1, wherein the grain boundary in the grain is disposed parallel to an electron movement direction.

9. An all-solid-state battery comprising:
   a cathode layer comprising the cathode thin film for an all-solid-state battery according to claim 1 and a current-collecting layer;
   an anode layer; and
   a solid electrolyte layer disposed between the cathode layer and the anode layer,
   wherein a charge/discharge rate after 100 cycles is 96% or more due to suppression of side reactions at an interface between the cathode layer and the solid electrolyte layer.

10. A pouch cell comprising the all-solid-state battery according to claim 9.

* * * * *